Feb. 14, 1950

A. HOROWITZ

APPARATUS COMPRISING A REVOLVING HEAD FOR TUNING DEVICES 2,497,773

Filed April 17, 1946

5 Sheets-Sheet 1

ALEXANDRE HOROWITZ.
INVENTOR.

BY [signature]

ATTORNEY.

APPARATUS COMPRISING A REVOLVING HEAD FOR TUNING DEVICES

Filed April 17, 1946 5 Sheets-Sheet 2

ALEXANDRE HOROWITZ.
INVENTOR.

BY

ATTORNEY.

Feb. 14, 1950

A. HOROWITZ

APPARATUS COMPRISING A REVOLVING HEAD FOR TUNING DEVICES 2,497,773

Filed April 17, 1946

5 Sheets-Sheet 3

ALEXANDRE HOROWITZ.
INVENTOR.

BY [signature]

ATTORNEY.

ALEXANDRE HOROWITZ.
INVENTOR.
BY Richard [signature]
ATTORNEY.

Feb. 14, 1950 A. HOROWITZ 2,497,773

APPARATUS COMPRISING A REVOLVING HEAD FOR TUNING DEVICES

Filed April 17, 1946 5 Sheets-Sheet 5

ALEXANDRE HOROWITZ.
INVENTOR.

BY [signature]

ATTORNEY.

Patented Feb. 14, 1950

2,497,773

UNITED STATES PATENT OFFICE 2,497,773

APPARATUS COMPRISING A REVOLVING HEAD FOR TUNING DEVICES

Alexandre Horowitz, Eindhoven, Netherlands, assignor, by mesne assignments, to Hartford National Bank and Trust Company, Hartford, Conn., as trustee Application April 17, 1946, Serial No. 662,678
In the Netherlands January 14, 1942

Section 1, Public Law 690, August 8, 1946
Patent expires January 14, 1962

9 Claims. (Cl. 74—10.1)

The present invention relates to a device for selecting a considerable number, for example at least twelve, pre-set positions of an adjustable electrical part, for example a slidable-electrode condenser in a radio-transmitting or radio-receiving apparatus or a measuring device, the various positions of the device corresponding to a certain number of adjusting screws equally distributed over the circumference of a revolving head, said adjusting screws alternately cooperating with the sliding shaft of the tuning member and each time determining the position thereof.

It was already known to utilize such devices having a rotary part, which is usually referred to in technics as "revolving head," in radio-receiving sets, e. g. according to United States Patent No. 2,066,246, a rotary drum having provided on it a certain number of adjusting screws which alternately determine the position of, for example, a variable condenser.

It is further known, e. g. according to United States Patent No. 1,684,519, to command a slidable-electrode condenser by means of such a revolving head. (The known devices had the drawback that the accuracy of adjustment of the tuning member left much to be desired as a result of disadvantageous shapes of the contact surfaces of the mechanical parts cooperating with each other.) Even a small deviation in the angular position of the revolving head was sufficient to bring about deviations in the position of the tuning member and this frequently led to non-permissible deviations from the adjustment in view of the comparatively small stroke of this part.

The present invention has for its purpose to obtain a device of the above-mentioned kind in which the reproducibility of the positions once set with the aid of the adjusting screws is very high, so that the tuning of the apparatus under any conditions keeps satisfying exactly the conditions imposed. In this case advantageous conditions of passage from adjusting screw to adjusting screw must be ensured inter alia by arranging a rather considerable number of these screws in the correct manner on the circumference of the revolving head.

According to the invention, for this purpose means are provided whereby the difference in height of the successive adjusting screws provided in the form of a circle on the revolving head is limited in the direction of sliding to a definite maximum, while the opposite surfaces on the extremities of the respective adjusting screws and on the part cooperating therewith are on the one hand given a curved shape and on the other hand flattened at right angles to the direction of sliding, the flattened part comprising an inclined guiding surface. The height of this surface in the direction of sliding must be equal to at least the maximum difference in stroke which may occur in this direction between consecutive adjusting screws, while the curvature of the opposite surface must be so chosen that the inclined surface in any position of cooperation with the curved surface constitutes a contact surface of the latter.

The construction according to the invention offers the advantage that small differences in the angular position of the rotary part or in the accuracy with which the directions of the geometric axes of the adjusting screws and the sliding shaft coincides, substantially do not act upon the sliding depth of the latter. The former is readily evident, since a comparative displacement of a part along a plane surface cannot possibly lead to a displacement of the part at right angles to the surface. In this case it is immaterial as to which of the two elements is located on the movable or on the fixed part of the device, since due to the shape of the curved surface the influence of small deviations in the axial direction upon the position of the sliding shaft in its direction of displacement is substantially negligible. The shape and the dimension chosen in accordance with the invention for the inclined surface and the opposite curved surface enable us to increase the difference in stroke length between the successive adjusting screws to a maximum and the arrangement of a large number of screws in close proximity of each other enables us to obtain a very large total stroke length of the tuning member, which implies a very high percentage accuracy of tuning.

In one advantageous embodiment of the inventive idea, the active extremity of the part having the inclined surface is bounded by a truncated conical envelope of which the axis is located in the sliding direction, the half top angle is at least 45°, the top surface in the relative position of the device constitutes a contact surface of the opposite curved surface and the height is equal to at least the maximum difference in stroke between two consecutive adjusting screws.

This form is particularly suitable both for the extremity of the slidable shaft of the tuning member with which the adjusting screws end on a curved surface and for the extremities of the adjusting screws with which the part cooperating therewith must locally exhibit a curved end surface.

In this case the part having the curved surface at the active extremity may be bounded by a spherical cap of which the half opening angle is equal to at least the angle of inclination of the inclined surface.

With this form of the curved surface it is always ensured that the inclined surface is a contact surface of the curved surface, this form being also particularly suitable for use with an adjusting screw.

It is frequently advantageous to provide the curved surface on a separate part placed between the adjusting screw and the sliding shaft in such manner that it can move in the sliding direction and constitutes a mechanical joining shackle between the extremities of the adjusting screw and the slidable shaft which are located on each side and flattened at right angles to the direction of sliding.

It is thus possible to cause the lateral forces which otherwise occur when the revolving head is rotated and the adjusting screw and the sliding shaft climb against each other, to be taken up by a separate part and thus to avoid the undesirable deformation and wear of the sliding shaft and its guiding.

It is advisable to make the said part in the form of a slidable member which swings about a shaft which is located in a transverse plane approximately at the height of the flattened extremities of the adjusting screw and the sliding shaft and is parallel to the plane of connection of the centre lines of the revolving head and the sliding shaft, this slidable member extending substantially outside the space in which the adjusting screws rotate in operating the revolving head and comprising a protrusion which extends radially within the space and between the flattened ends of the adjusting screws and the sliding shaft and exhibits at right angles to the swinging axis of the slidable member a curved profile, preferably circular, of which the said flattened extremities in the position concerned constitute contact surfaces.

In this form of construction the spacing between the sliding shaft and the adjusting screw is substantially constant, independently of the position of the slidable member remain sufficiently far out of engagement in adjusting the revolving head. The transmission of transverse movements in adjusting the revolver is substantially precluded due to the chosen position of the slidable member.

It is advisable to arrange the adjusting screws of the revolving head in parallel to each other in the circumferences of two adjacent discs which jointly constitute the revolving head and between which are provided means whereby the relative displacement of consecutive adjusting screws is limited and the relative clearance between adjusting screws and discs is obviated.

In this case, the adjusting screws are preferably inserted with a threaded part into threaded holes of one disc and with a smooth part into smooth holes of the other disc.

In this manner a very simple and stable unit is obtained, the adjusting screws being fit in the normal manner in the two discs, while it causes no difficulty at all to obviate any clearance by some means or other used in technics and thus to ensure the desired accuracy of adjustment even with low manufacturing cost.

It is advantageous for this purpose to provide resilient members, e. g. plate springs, between consecutive adjusting screws in such manner that the reaction of the spring is taken up on the one hand by one of the screws and on the other hand by the two adjacent screws, so that the first-mentioned screw is pressed fast in the holes of the discs in a direction which is substantially inverse to that in which this is the case with the two adjacent screws.

A spring is thus obtained which is periodically placed in V-shape between three consecutive adjusting screws which may be provided in a very simple manner between the latter and the discs and, due to lateral pressure, also obviates the transverse and the longitudinal clearance, the latter by pressing the threaded flanks of the adjusting screw and the threaded hole against each other.

The said V-shaped springs may advantageously constitute in common one continuous wire or band which highly facilitates the application of the resilient locking of the adjusting screws.

In order to limit the difference in height between consecutive adjusting screws, it is advisable to provide them with a part which is thicker than the diameter of the screw-thread and has such a length that the screw is only adjustable over a limited stroke length, while the length of the consecutive adjusting screws measured from the thickened part and in the direction of the sliding shaft, each time increases, the construction being such that the maximum difference in height between consecutive adjusting screws is substantially determined by the sum of the stroke lengths of the two adjusting screws and their difference in length.

In this manner the total stroke length that may be obtained by means of the revolving head is covered in a number of intervals which are preferably equal and overlap each other, the number of the intervals corresponding to that of the adjusting screws minus one and each interval enabling one adjustable position of the tuning member to be chosen. In this case, the maximum difference in height between two consecutive screws must not be greater than the height of the inclined surface provided on the adjusting screws or on the part cooperating with the latter.

In another advantageous embodiment of the invention adjusting screws of equal length are arranged in close proximity of each other and alternately provided with one and two flanges respectively, the construction being such that one flange of one adjusting screw falls between two flanges of the adjacent adjusting screw, while the difference in height of one flange and the free space between the two flanges within which extends the first-mentioned flange.

This construction offers the advantage that only two different forms of adjusting screws are required, while in addition the user has much more liberty in the choice of the total stroke length and of the individual adjustable positions of the revolving head, the total stroke length being only limited upwardly and thus up to a distance which is equal to the maximum difference in height between two adjacent adjusting screws multiplied by the number of these screws minus one.

If one wishes to arrange a very large number of adjusting screws on the same revolving head, it is advisable to place them on the circumferences of more than one circle, in such manner that the adjusting screws succeeding each other in the direction of rotation are alternately placed on one and on the other circle, while the part that cooperates with the adjusting screws comprises a narrow curved end surface of small width of which the longitudinal direction is normal to the sliding shaft and to the direction of displacement of the adjusting screws, the latter being bounded at their active extremities by a straightly truncated spherical surface.

In contradistinction to what has been described hitherto, in this construction the adjusting screws comprise flattened end surfaces. This construction offers the advantage that there is only one part with a curved end surface which is arranged before or on the sliding shaft and as a result thereof may be locked against torsion and consequently may exhibit without any objection an elongated form which is narrowest in the direction of rotation of the revolving head. The latter is of much importance with adjusting screws placed in close proximity of each other. Placing the latter on more than one circumference facilitates also the arrangement of a certain number of screws of a definite diameter on a circle having a not too large centre line.

In the above-described manner a passage between adjacent screws is possible in each case, except in the case of the adjacent shortest and longest adjusting screws. In order to make it possible for the revolving head to pass these adjusting screws in either direction without particular control members being required, it is advisable to provide means whereby a passage from the shortest to the adjacent longest adjusting screw is rendered possible by separating the sliding shaft and the revolving head in the direction of sliding.

In this case a lever, of which the axis crosses the sliding shaft at right angles, may advantageously be caused to cooperate with the sliding shaft, while on passing from the shortest to the longest adjusting screw a cam provided on the revolving head pushes the sliding shaft and, if the case may be, the sliding member located between the latter and the adjusting screws through the intermediary of the lever from the adjusting screws. In this construction the stroke at the point where the lever cooperates with the shaft may be larger than in the point of engagement of the cam which is closer to its pivot, so that use may be made of a smaller cam having a shorter leading surface. In this case the sliding shaft may already be pushed away within the comparatively small angle of rotation of the adjusting screws which is available between two consecutive distribution points of the revolving head, so that it is not necessary that a rather considerable adjustable angle for the arrangement of a leading surface is sacrificed.

In order that the invention may be more clearly understood and readily carried into effect, it will be set out more fully with reference to the accompanying drawings.

Figures 1, 2, 3:
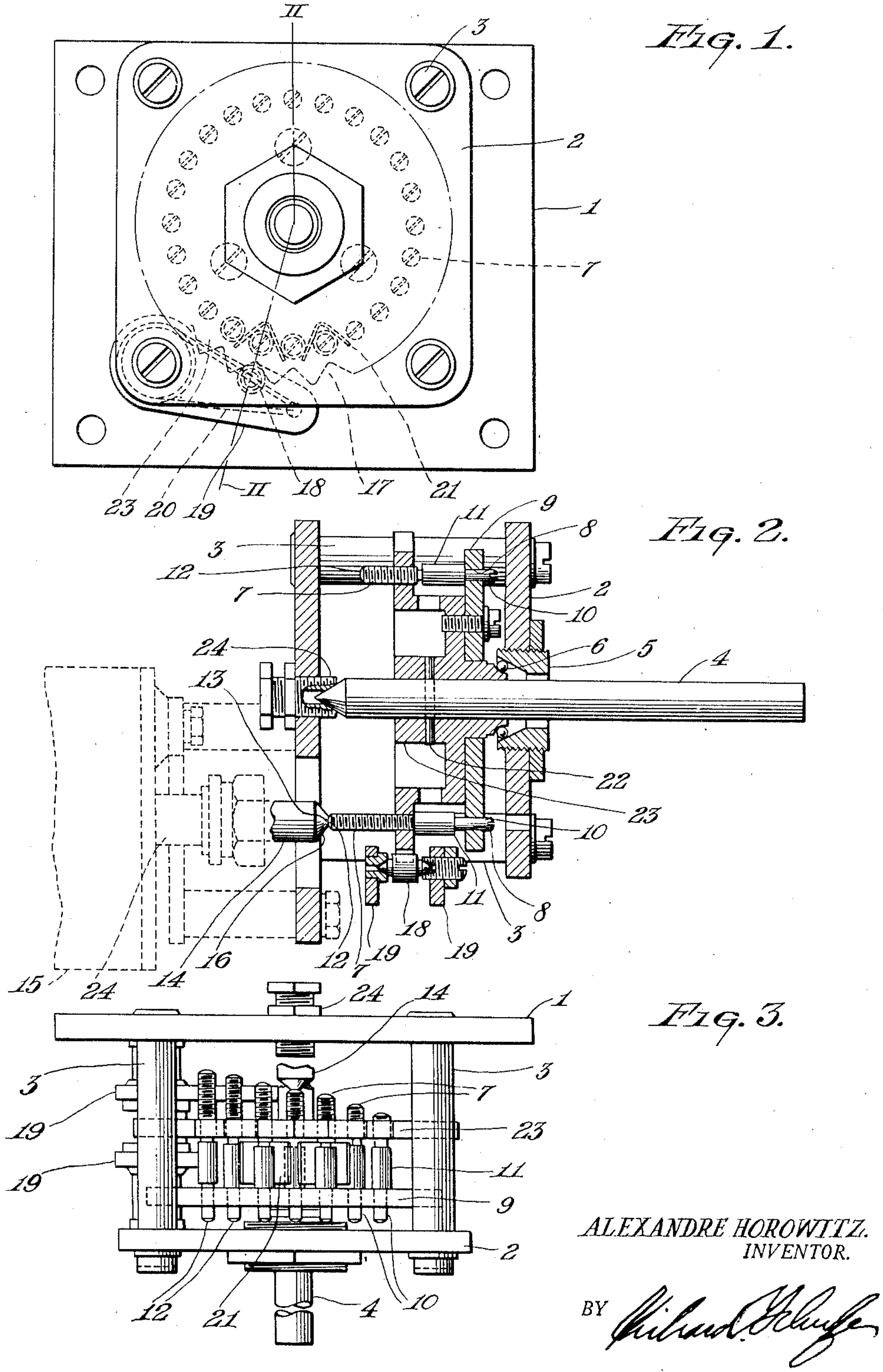
Figs. 1 to 3 show different projections, partly in section, of one form of construction of the tuning device according to the invention.

The tuning device shown in Figs. 1 to 3 is constituted by a fixed part which is constituted by head plates 1, 2 and columns 3 and in which a shaft 4 is journalled free from clearance and in a re-adjustable manner by means of a ball-ring 5 comprising balls 6 and a conical bearing 24. The extremity 4 of the shaft serves to fasten the drive (not shown), the shaft having fastened on it, by means of a pin 22, a carrier 23 in which threaded holes for adjusting screws 7 are provided. These adjusting screws are arranged on a circumference having 24 equal distributions and on the side opposite to the threaded holes are guided in smooth bores 8 of a flat ring 9 screwed on the carrier 23. Between the threaded part 7 and the smooth part 10 of the adjusting screws is a thicker cylindrical part 11, due to which the stroke of each adjusting screw is limited to about 2 mms. As can be seen from Fig. 2, the screws 7 have a spherical end surface 12 which cooperates with a flattened part 13 of the sliding shaft 14 by means of which a slidable-electrode condenser 15 which is but partly shown is operated, the movable part of this condenser being pushed in the direction of the adjusting screw 7 by means of a spring not shown in the drawing. In order to make it possible that the adjusting screw 12 can at any moment climb against the conical surface 16 of the sliding shaft 14, the axial height of this surface, the stroke length of the screws 7 and the difference in length between consecutive screws 7 are so chosen that the maximum difference in height of two consecutive screws is never larger than the height of the inclined surface measured in the sliding direction.

The periphery of the carrier 23 has provided in it a number of recesses 17 which corresponds to the number of adjusting screws and into which may fall a pressure roller 18 which is journalled in a re-adjustable manner and without aperture in a double lever 19 which is pushed against the periphery of the carrier by means of a spring 20. The revolving head is thus locked in the operative position of each of the adjusting screws. Between the successive adjusting screws are provided V-shaped flat springs 21 which push outwardly the adjusting screw embraced by them, whereas the adjusting screws located between the springs are pushed inwardly due to their reaction. Thus, the clearance between the screw-thread and the guides 8 is obviated so that the adjustment of the slidable electrode condenser remains reproducible even with multiple operations. Owing to the advantageous value of about 30° which is chosen for the inclination of the spherical surface 12 and due to the half opening aperture of the spherical cap which bounds the extremity of the adjusting screw being more than 30°, it is always ensured that a "touching" contact takes place between the conical surface and a point of the spherical surface of the screw. The wear of the parts sliding on one another is thus reduced to the extreme minimum so that when use is made of a suitable and well-hardened kind of steel the exact position of the slidable electrode condenser with a definite adjustment of the revolving head is retained for a long time. Small deviations in the angular position of the revolving head which are substantially obviated already due to the locking by the pressure roller are neutralized due to the cooperation of the spherical surfaces 12 with the plane surface 13. Any changes in the relative angular position of the adjusting screw and the sliding shaft, due to which centre lines of these parts would no longer be exactly in line but form a very small angle with each other, are thus also practically without effect on the accuracy of the displacement of the condenser. The revolving head may be rotated back and forth over nearly 360°, but at the point where the longest and the shortest adjusting screws are contiguous to each other a rotation is possible only in the direction from the longest to the shortest adjusting screw.

Figures 4, 5, 6:
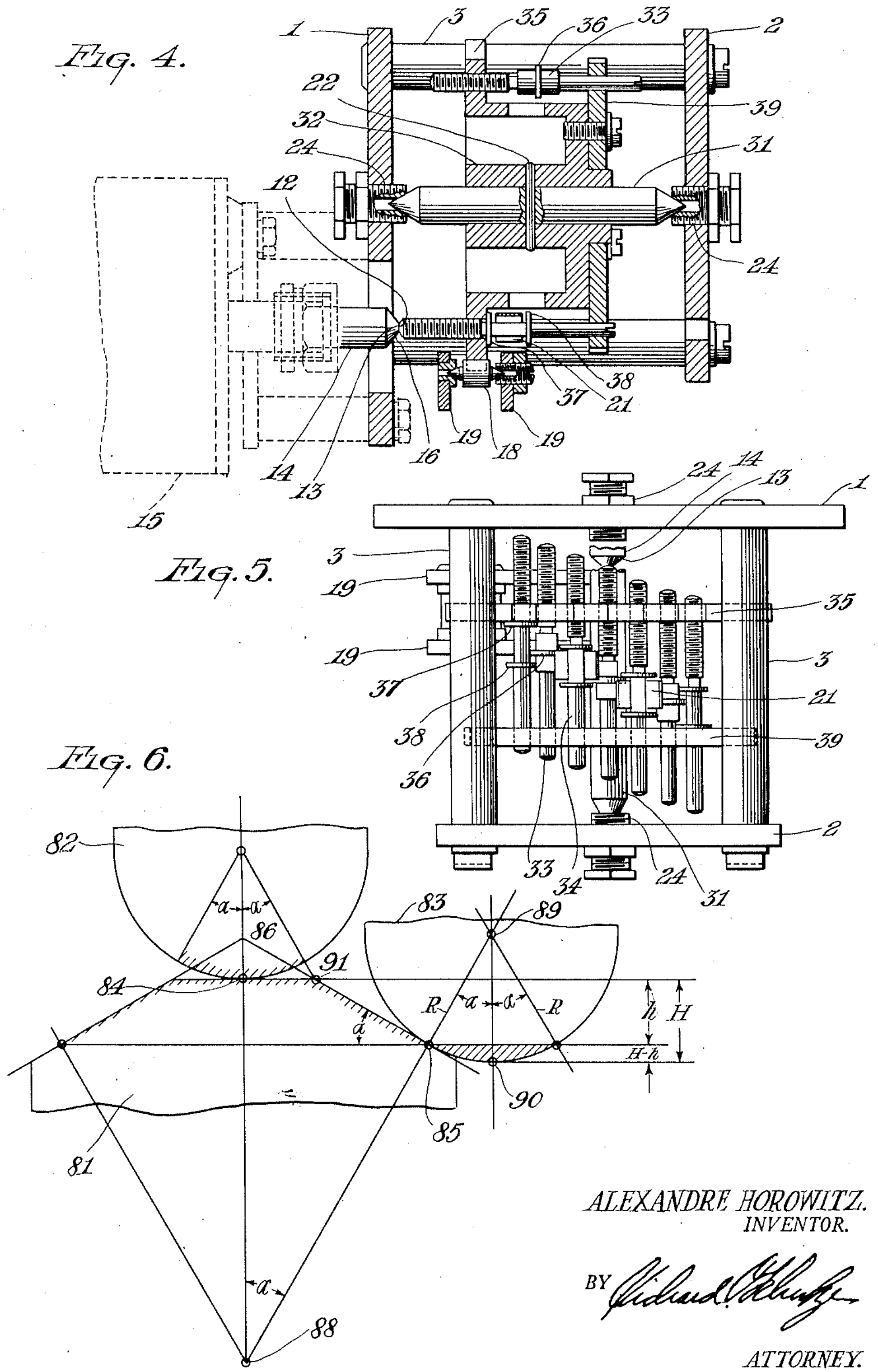
Figs. 4 and 5 show different projections, partly in section, of another form of construction of the tuning device according to the invention.
Fig. 6 is a schematic view of the manner in which an inclined and a curved end surface cooperate in accordance with the invention.

Figs. 4 and 5 show another variety of the construction shown in Figs. 1, 2 and 3, which on the whole corresponds to the latter, but differs therefrom in the manner in which the difference in height of the adjusting screws is limited Corresponding parts of Figs. 1–5 are indicated by the same numerals. In this case the shaft 31 has mounted on it a carrier 32 which, jointly with the disc 39, serves as a bearing for the adjusting screws 33 and 34 respectively which are equally distributed over the circumference of the revolving head. As before, the adjusting screws have spherical end surfaces 12 and the sliding shaft has a truncated conical end surface 16. Furthermore, the same locking arrangement is effected by means of a pressure roller 18. The radial distance between the toothed flange 35 of the carrier 32 and the outer edges of the disc 39, which is toothed for driving the revolving head, is here so large that each adjusting screw may traverse the whole strokelength for which the revolving head is constructed, said stroke length being equal to that of the slidable electrode condenser 15. For limiting the difference in height between the consecutive adjusting screws, however, adjusting screws 33 having a single flange 36 and adjusting screws 34 having two flanges 37 and 38 are alternately arranged so closely to each other on the circumference of the revolving head that each adjusting screw can only be adjusted until it is checked by the flange of an adjacent adjusting screw due to the flanges concerned overlapping each other as viewed in the axial direction of the revolving head. In this manner also it is always ensured that a following farther extending adjusting screw is capable, by means of the inclined surface 16, to climb against the sliding shaft 14 and to come in line with the latter, without it being necessary for the sliding shaft to be lifted off beforehand from the adjusting screws. In contradistinction to the construction shown in the first three figures, in this case use may on principle be made of any desired adjusting screw for any desired point of the range of adjustment of the slidable electrode condenser. In the construction first described it is necessary for the desired sequence of the adjustable length to be fixed once for all at least approximately by the choice of the length of the individual adjusting screws 7. However in the construction shown in Figs. 4 and 5, the choice of this sequence is also limited, since it is impossible between adjacent adjusting screws to obtain a difference in height which is larger than a maximum amount determined by the shape of the adjusting screws and the sliding shaft.

Fig. 6 shows what relation exists between the opening angle of a circularly curved end surface, preferably cylindrical or spherical, and the angle of inclination of the inclined surface cooperating therewith in accordance with the invention. In this figure it may be assumed that 81 is the extremity of a sliding shaft which is engaged in 84 by an adjusting screw 82, which is in line with the sliding shaft. The following adjusting screw 83 is pushed forward up to the maximum difference in height H relatively to the adjusting screw 82 and touches in 85 the conical inclined surface of the sliding shaft 81 when it is displaced in the direction of the sliding shaft. The point 84 is located in the top surface of the truncated cone which bounds the sliding shaft 81 and of which the generatrix 85—86 exhibits an angle of inclination of 30° relatively to the bottom surface. This is a mean value for the practical case in which may be at most 45°, since with larger angles of inclination the variation and the resistance during climbing up increase in a troublesome manner.

The part of the truncated cone which cooperates with the adjusting screws between the extreme positions lies between 84 and 85 and is indicated by crosshatching, which is also the case with the relative part of the adjusting screw. It can readily be seen from the figure that the half opening angle of this curved surface is equal to and consequently is also 30°. This appears from the uniformity of the angle 87, 85, 86 and 85, 89, 90, of which the limbs are normal to each other, and that of the angles 85, 88, 87 and 85, 89, 90 as alternate interior angles. Consequently, when the opening angle 85, 89, 90 is at least equal to the angle of inclination, the adjusting screw will always contact with the sliding shaft when climbing the latter. It further appears from the figure that the height $h$ is always somewhat smaller than the maximum difference in height H. The amount $H-h$ is, however, of little importance in practice since it is equal to (1—cos)R when the radius of curvature 85, 89 is taken equal to R. In the practical case of a diameter of 3 mms. of the adjusting screws and an opening angle of the spherical surface of 90°, i. e.=45°, the radius of curvature may be taken as 2.1 mm. In this case one obtains cos 0.7 and $H-L$ 0.6 mm., a difference which may be considered as an addition to $h$ to cause the adjusting screw to run up at any time in an undisturbed manner, so that in practice the height $h$ must be equal to at least the maximum difference in height H which in the relative case may occur between adjacent adjusting screws.

With regard to the cooperation of the two end surfaces it may be mentioned that the point 91 on the boundary of the top surface and the conical envelope is an exception to the rule of the "touch" contact of the two components. It is evident that in practice some rounding off must be applied, which obviates all the difficulties especially in view of the fact that in contradistinction to the point 85 there is no question of a collision of surfaces which approach each other but only a sliding along in contact with the opposite part. When considering the foregoing it does not cause difficulty to realize the optimum conditions of climbing for the adjusting screw and the sliding shaft.

Figures 7, 8, 9:
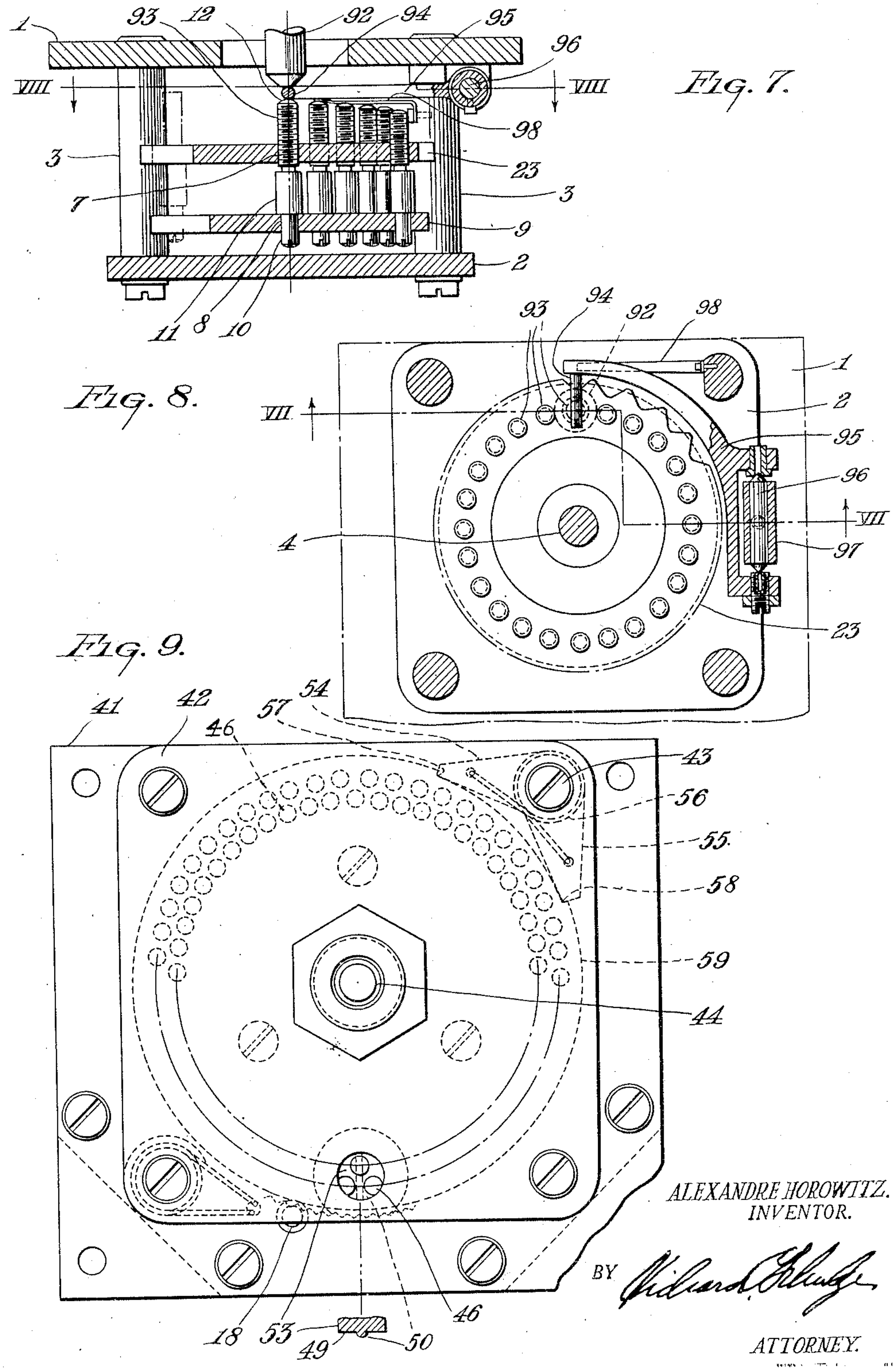
Figs. 7 and 8 show a revolving head having a sliding shaft and a slidable member.
Figs. 9 to 11 show a construction in which a hundred adjusting screws are arranged on two concentric circles.

Figs. 7 and 8 show in two projections, partly in cross-section, a revolving head 23 according to the invention whose construction is identical with that shown in Figs. 1–3, the only difference consisting in the use of a sliding shaft 92 and adjusting screws 93 which both have a plane end surface, these end surfaces having provided between them a cylindrical protrusion 94 of a slidable member 95 mounted free from clearance and in a re-adjustable manner on a shaft 96 which is secured in a cam 97 of the mounting plate 1. A plate spring 98 secured to the column 3 steadily pushes the part 94 against the sliding shaft 93, so as to prevent it from falling between two adjustable positions of the revolving head between the adjusting screws. The slidable member 95 lies but for the protrusion 94 outside the space in which the adjusting screws rotate so that interfering collisions between the slidable member and the adjusting screws are prevented even in the cases in which a short adjusting screw is in contact with 94 and the longest adjusting screws run along the slidable member. The axis about which the slidable member swings crosses the sliding shaft at right angles and is located in a plane cutting the centre line of the sliding shaft in 94. The part 94 thus moves between the sliding shaft 92 and the adjusting screw 93 substantially in the direction of sliding, so that tangential forces from the adjusting screws to the sliding shaft are not transferred. Due to the cylindrical shape of 94 having an axial direction directed at right angles and radially to the centre line of the revolving head, the mechanical contact with the adjusting screw 92 remains insensitive to small deviations in the relative orientation of the adjusting screw and the sliding shaft in the adjusted position. The precision of adjustment of the condenser is consequently retained with security.

Figures 10, 11, 13:
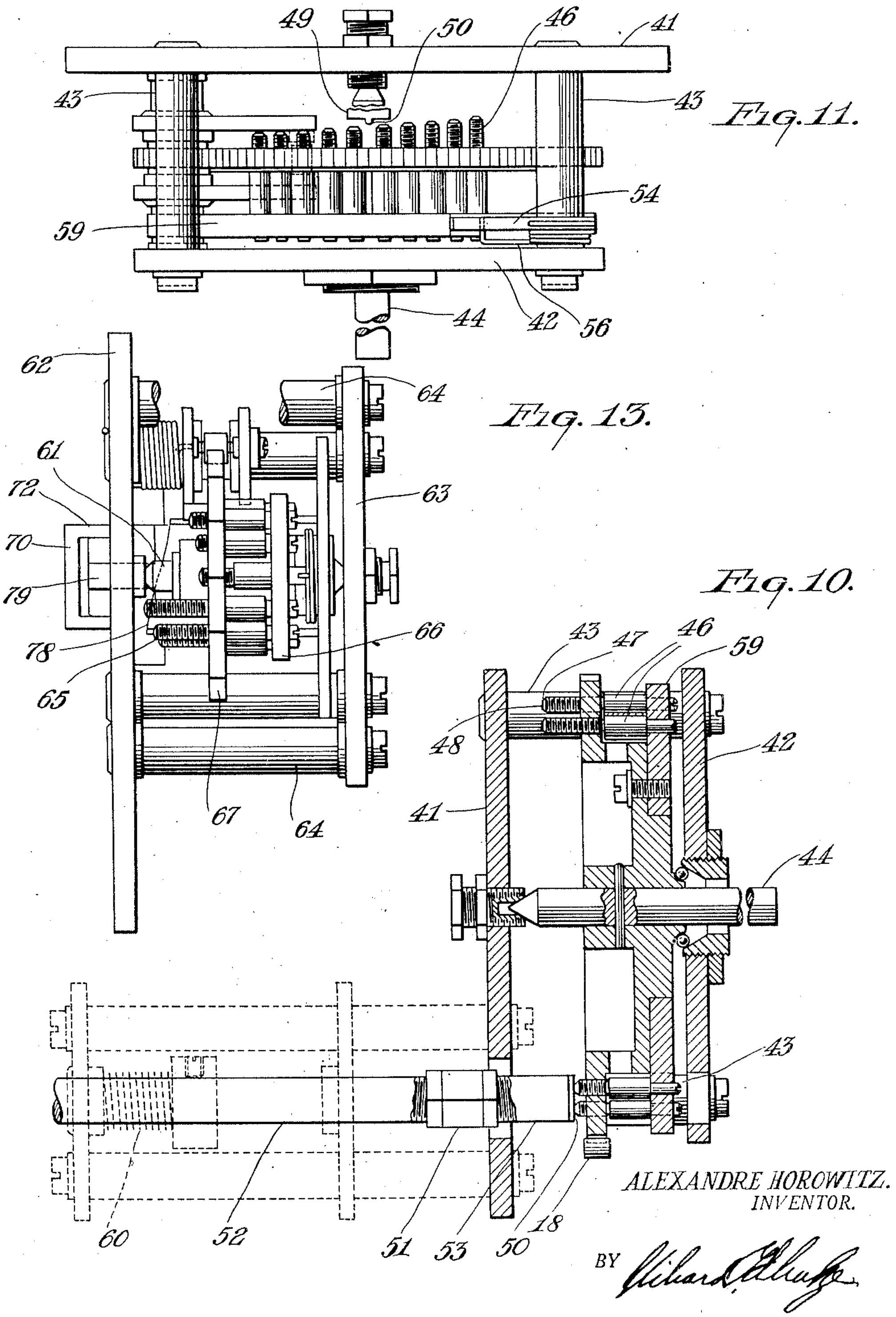
Figs. 12 to 14 show a construction in which the revolving head may be turned through in either direction.

Figs. 9, 10 and 11 show how a very large number of adjusting screws may be arranged on the revolving head by placing them on two concentric circles in such manner that a radius rotating about the centre line of the revolving head alternately cuts an adjusting screw on the inner circle and an adjusting screw on the outer circle. It is evident that in this case the difference in stroke between consecutive adjusting screws is considerably smaller than in the constructions already described, since with a given angle of inclination the maximum difference in height is determined by the distance over which the relative parts are displaced in the tangential direction with each step of the revolving head.

The revolving head shown in Figs. 9–11 is constituted by two end plates 41 and 42 which are spaced apart by means of four columns 43, a shaft 44 being journalled between them in a manner corresponding to that illustrated in Figs. 1–3. The adjusting screws 46 are here provided with threaded parts of regularly increasing length and, in contradistinction to that of the previous figures exhibit, at the active extremities a conical leading surface 47 and a plane end surface 48, the sliding shaft 14 having provided on it a plane end surface 49 having a rib 50 of cylindrical profile. The rib 50 is normal to the direction of displacement of the adjusting screws and is narrow in this direction so that in the adjusted position it does not engage with the very proximate leading surfaces of the adjacent adjusting screws. Consequently, it must be possible in this case to re-adjust the sliding shaft whilst retaining this position of the rib 50. For this purpose use is made of a double coupling nut 51 having left-hand and right-hand screw-threads which determine the length of the sliding shaft independently of the angular position of the parts 52 and 53 of this shaft. The condenser shaft (not shown) is maintained by means of a spring in continuous contact with the sliding shaft 52—53 which itself comprises a return spring 60, due to which it is always forced against the adjusting screws. Lateral forces which occur in adjusting the revolving head are taken up by the sliding shaft and are not transferred to the condenser shaft. For the locking by means of the pressure roller 18 reference may be made to the preceding figures. The revolving head carries a hundred adjusting screws and may be rotated to the extent of about 360°, the two final positions being determined by pawls 54 and 55 respectively. The latter are pushed against the circumference of the disc 42 by means of a common tension spring 56 and stop the revolving head comprising such a number of adjusting screws has a very small switching angle and thus has a tendency with direct hand operation to rotate through the position desired. This construction is therefore particularly suitable for driving, if necessary at a distance, by means of a retarding transmission.

Figure 12:
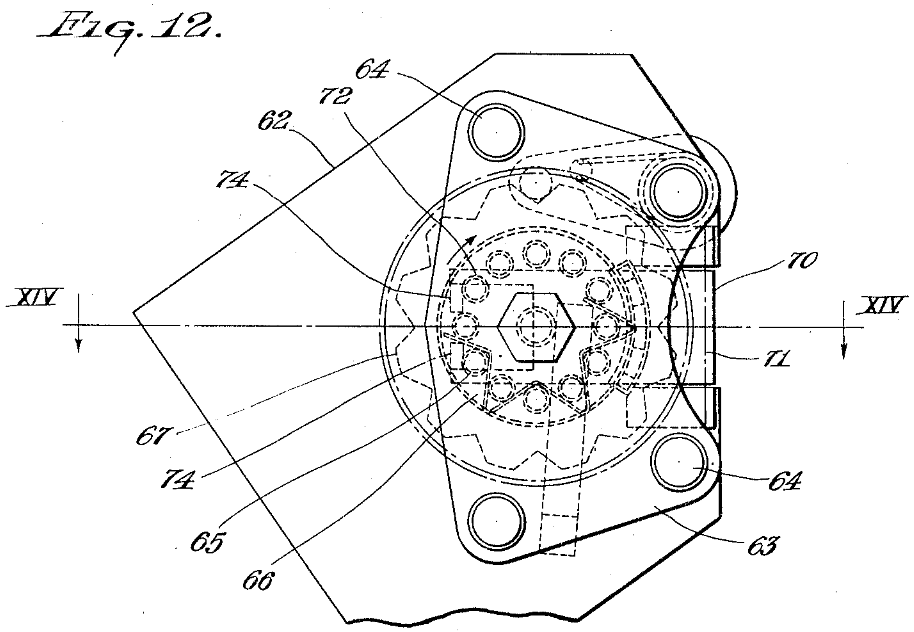
Figure 14:
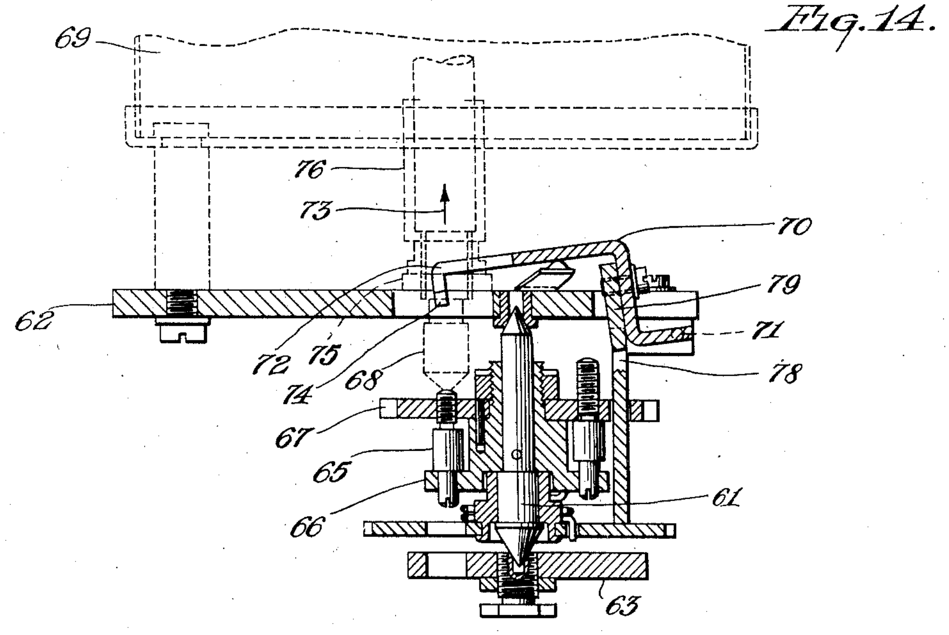

Figs. 12, 13 and 14 show how a revolving head having 12 positions may be constructed in such manner that switching through over more than 360° in either direction is possible. The construction of this revolving head also substantially corresponds to those already described. The shaft 61 is journalled in end plates 62 and 63, which are spaced apart by columns 64, and comprises adjusting screws 65 arranged in a carrier 66 and in a disc 67 provided with threaded holes for the adjusting screws and with for locking recesses.

The adjusting screws 65 and the sliding shaft 68 of the slidable electrode condenser 69 may be lifted from each other by means of a forked lever (i. e. a lever of which the two points of engagement are located on the same side of the pivot), which is pivoted in 71 about a shaft which crosses the centre line of the sliding shaft at right angles, and is located outside the circle of the adjusting screws. To this end, the forked part 72 of the lever 70 embraces the sliding shaft 68 and may lift up the latter with the aid of the protrusions 74 in the direction of the arrow 73 by means of a counter-nut 75, the lever being lifted by means of the cam 79. In fact, on passing from the shortest to the longest adjusting screw a cam 78 of the revolving head climbs against the cam 79, which may be effected within one adjusting screw interval, since lever 70 has a suitable lever ratio so that even a comparatively small stroke of 79 displaces the sliding shaft 68 to a sufficient extent.

Protecting the adjusting screws against clearance and undesirable displacement by means of V-shaped springs, as is shown in a number of the forms of construction, may also advantageously be effected by means of a single band spring extending between the adjusting screws in a zigzag line. Such a spring is obtained when the consecutive V-shaped springs are completed to form a zigzag spring.

I claim:

1. Apparatus for adjusting an electrical device provided with a slidable control shaft member having a conical-shaped end portion, which comprises a support member provided with spaced apart parallel head plates, bearing members mounted on said plates, an actuating shaft member mounted for rotation on the said bearing members, a disc-shaped toothed revolving head member mounted between the said head plates for rotation with the said actuating shaft and having a plurality of threaded holes symmetrically positioned about the axis of the said actuating shaft adjacent the outer periphery of the said head member, a flat ring-shaped member secured to the said head member for rotation therewith and having a plurality of smooth bore holes respectively in alignment with the threaded holes of the said head member, a plurality of threaded pin-shaped members each having an enlarged central portion and formed with a threaded portion having inclined surfaces at one end and a slotted smooth portion at the opposite end, said threaded portions being respectively mounted in said holes so that the said enlarged portions will be positioned between the said head member and the said ring-shaped member, a resilient means for individually pressing the said pin-shaped members against the said ring-shaped member, a roller member normally positioned between certain of the teeth of the said head member, and a resilient arm-shaped member rotatably mounted on the said fixed support member so as to oppose movement of the said roller member thereby to positively position the said head member, the said electrical device being mounted on the said fixed member so that the said conical-shaped end of the resilient control shaft will be positioned in the path of the inclined surfaces of the said pin-shaped threaded members one after the other whereby the said electrical device will be adjusted according to the rotation of the said actuating shaft member.

2. Apparatus for adjusting an electrical device provided with a resilient slidable control shaft member having a conical-shaped end portion, which comprises a fixed support member provided with rigidly spaced apart parallel head plates, bearing members mounted on said plates, an actuating shaft member mounted for rotation on the said bearing members, a disc-shaped toothed revolving head member mounted between the said plates for rotation with the said actuating shaft member and having a plurality of threaded holes symmetrically positioned about the axis of the said actuating shaft adjacent the outer periphery of the said head member, a flat ring-shaped member secured to the said head member for rotation therewith and having a plurality of smooth bore holes respectively in alignment with the threaded holes of the said ring-shaped member, a plurality of threaded pin-shaped members each having an enlarged central portion and formed with a threaded portion with an inclined surface at one end and a slotted smooth portion at the opposite end, said threaded portions being of varying lengths, said pin-shaped members being respectively mounted in the aligned holes so that the said enlarged portions will be positioned between the said head member and the said ring-shaped member and the threaded portions will be of progressively varying lengths, resilient means for individually holding the said screw members against the said ring-shaped member, a roller member normally positioned between certain of the teeth of the said head member, a resilient arm-shaped member rotatably mounted on the said fixed support member so as to oppose radial movement of the said roller member thereby to positively position the said head member, said electrical device being mounted on the said fixed support member so that the conical surface of the said control shaft will be positioned in the path of one of the inclined surfaces of the said screw-shaped members, the height of the said conical surface in the direction of its slidable direction being equal to at least the maximum difference in height which may occur in this slidable direction between adjacent screw-shaped members, the curvature of the said surface of the conical-shaped end of the control shaft being so formed that the inclined surfaces of two adjacent pin-shaped members will cooperate in any position of the said actuating shaft.

3. Apparatus for adjusting an electrical device provided with a resilient slidable control shaft member having a conical-shaped end portion, which comprises a fixed support member provided with at least two rigidly spaced apart parallel head plates, bearing members mounted on said plates, an actuating shaft member mounted for rotation on the said bearing members, a disc-shaped toothed revolving head member mounted between the said plates for rotation with the said actuating shaft and having a plurality of threaded holes symmetrically positioned about the axis of the said actuating shaft adjacent the outer periphery of the said head member, a flat ring-shaped member secured to the said head member for rotation therewith and having a plurality of smooth bore holes respectively in alignment with the threaded holes of the said head member, a plurality of threaded pin-shaped members each having an enlarged central portion and formed with a threaded portion with an inclined surface at one end and a slotted smooth portion at the opposite end, said threaded portions being of various lengths and respectively mounted in said holes so that the said enlarged portions will be positioned between the said head member and the said ring-shaped member, resilient means for individually holding the said screw members against the ring-shaped member, a roller-like member normally positioned between certain of the teeth of the said head member, a resilient arm-shaped member rotatably mounted on said fixed support so as to oppose radial movement of the said roller member thereby to positively position the said head member, said electrical device being mounted on said fixed support member so that the conical surface of the said control shaft will be progressively positioned in the paths of the inclined surfaces of the said screw-shaped members one after the other as the said actuating shaft member is rotated against the resistance of the said arm-shaped member, each of the said inclined surfaces of the said screw-shaped members being bounded by a truncated conical envelope, the axis of which is located in the direction of the sliding movement of the said control shaft, the top portion of the envelope constituting a contact surface and the height being equal to at least the maximum difference in stroke length between two consecutive adjusting screws.

4. Apparatus for adjusting an electrical device provided with a slidable resilient control shaft having a conical-shaped end portion, which comprises a fixed support member provided with two spaced apart parallel head plates, bearing members mounted on said plates, an actuating shaft member mounted for rotation on the said bearing members, a disc-shaped toothed revolving head member mounted between the said plates for rotation with the said actuating shaft and having a plurality of threaded holes symmetrically positioned about the axis of the said actuating shaft adjacent the outer periphery of the said carrier member, a flat ring-shaped member secured to the said head member for rotation therewith and having a plurality of smooth bore holes respectively in alignment with the threaded holes of the said head member, a plurality of threaded pin-shaped members each having an enlarged central portion and each formed with a threaded portion with an inclined surface adjacent a flat end and a smooth slotted portion at the opposite end, said threaded portions being of progressively varying lengths and positioned in said holes so that the said enlarged portions will be mounted between the said head member and the said ring-shaped member, ring-shaped resilient means for individually holding the said screw members against rotation, a roller-like member normally positioned between certain of the teeth of the said head member, a resilient arm-shaped member rotatably mounted on said fixed support so as to tend to oppose the actuation of the said roller member to thereby position the said head member, said electrical device being mounted on said fixed support member so that the conical surface of the said control shaft will be resiliently positioned in the path of the inclined surfaces of the said pin-shaped members one after the other according to the rotation of the said actuating member and the progressive lengths of the said threaded portions, the flat end parts of the said pin-shaped members adjacent said inclined surfaces constituting a mechanical joining shackle between the respective pin-shaped members and the said control shaft.

5. Apparatus for adjusting an electrical device provided with a slidable resilient control shaft having conical-shaped end portions, which comprises a fixed support member provided with two spaced apart parallel head plates, bearing members mounted on said plates, an actuating shaft member mounted for rotation on the said bearing members, a disc-shaped toothed rotating head member mounted between the said head plates for rotation with the said actuating shaft and having a plurality of paralleled threaded holes symmetrically positioned about the axis of the said actuating shaft adjacent the outer periphery of the said carrier member, a flat ring-shaped member securely bolted to the said head member for rotation therewith and having a plurality of smooth bore holes respectively in alignment with the threaded holes of the said head member, a plurality of threaded pin-shaped members each having an enlarged central portion and each formed with a threaded portion with a cammed surface at one end and a slotted smooth portion at the opposite end, said threaded portions being of various lengths and positioned in said aligned holes so that the said enlarged portions will be positioned between the said head member and the said plate member and the said threaded portions will progressively vary from the longest to the shortest, band-shaped resilient means for individually retarding the said screw members against rotation, a roller-like member normally positioned between certain of the teeth of the said head member, a resilient arm-shaped member rotatably mounted on said fixed support so as to tend to resist a radial outward movement of the said roller member thereby to positively position the said head member when rotated by the said actuating member, said electrical device being mounted on said fixed support member so that the conical surface of the said slidable control shaft will be positioned in the path of the said inclined surfaces of the said screw-shaped members as they are moved one after the other across the surface of the said conical-shaped end to sequentially and progressively move the said control shaft, each of the said pin-shaped members being further provided with a flat end surface contacting with the surface of the said conical end-shaped portion of the slidable control shaft in such a manner that it constitutes a mechanical joining shackle between the said screw-shaped members and the said sliding shaft intermediate the contacting intervals of the said inclined surfaces, said flattened surface being at right angles to the direction of motion of the said slidable control shaft.

6. Apparatus for adjusting an electrical device provided with a resilient slidable control shaft having a conical-shaped end portion, which comprises a fixed support member provided with two rigidly spaced apart parallel head plates, bearing members mounted on said plates, an actuating shaft member mounted for rotation on the said bearing member, a disc-shaped toothed rotating head member mounted between the said head plates for rotation with the said actuating shaft and having a plurality of threaded holes symmetrically positioned about the axis of the said actuating shaft near the outer periphery of the said head member, a flat ring-shaped member secured to the said head member for rotation therewith and having a plurality of smooth bore holes respectively in alignment with the threaded holes of the said head member, a plurality of threaded rod-shaped members each having an enlarged central portion and each formed with a threaded portion with inclined and flat surfaces at one end thereof and a slotted smooth portion at the opposite end thereof, said threaded portions being of various lengths and respectively positioned in said holes so that the said enlarged portions will be positioned between the said member and the said plate-shaped member, a band-shaped resilient member for individually holding the said screw members against the said ring-shaped member, a roller-shaped member normally positioned between certain of the said teeth of the said carrier member, an arm-shaped member rotatably mounted on said fixed support, resilient means for causing the said arm-shaped member to tend to hold the said roller member against said teeth, said electrical device being mounted on said fixed support member so that said conical surface of the said slidable control shaft will be continuously positioned in the paths of the said inclined and flat surfaces one after the other as the said disc-shaped carrier member is rotated by said actuating shaft.

7. Apparatus for adjusting an electrical device provided with a resiliently slidable control shaft having a conical-shaped end portion, which comprises a fixed support member provided with two spaced apart parallel head plates, bearing members mounted on said plates, an actuating shaft member mounted for rotation on the said bearing members, a disc-shaped toothed rotating head member mounted between the said head plates for rotation with the said actuating shaft and having a plurality of parallel threaded holes symmetrically positioned about the axis of the said actuating shaft adjacent the outer periphery of the said carrier member, a flat ring-shaped member bolted to the said head member for rotation therewith and having a plurality of parallel smooth bore holes respectively in alignment with the said threaded holes of the said head member, a plurality of threaded rod-shaped members each having an enlarged central portion and formed with a threaded portion with inclined and flat surfaces at one end and a smooth slotted portion at the opposite end, said threaded portions being of various lengths and respectively positioned in said holes so that the enlarged portions will be positioned between the said head member and the said plate member according to the thread adjustments of the said respective rod-shaped members, a bar-shaped resilient member for individually holding said screw members against the walls of the smooth bore holes of the said ring-shaped member, a roller member normally positioned between certain of the teeth of the said carrier member, a resilient arm-shaped member rotatably mounted on said fixed support so as to tend to oppose the actuation of the said roller-shaped member, said electrical device being mounted on said fixed support member so that the conical surface of the said control shaft will be positioned in the paths of the surfaces of the said rod-shaped members one after the other according to the individual adjustments of the said rod-shaped members, said adjustments being so related to each other that a rotation of the said actuating shaft in one direction will cause the said surfaces of the said screw-shaped members to progressively move the said slidable control shaft along its direction of movement without interruption in the collective contacting action between the said conical-shaped end portion of the said slidable control shaft and the inclined surfaces of the said screw-shaped members.

8. Apparatus for selectively adjusting an electrical device provided with a resilient slidable control shaft having a cam-shaped end portion, which comprises a fixed support member formed with two rigidly spaced apart parallel head plates, bearing members mounted on said plates, a shaft mounted for rotation on the said bearing members, a disc-shaped toothed rotating head member mounted between the said plates for rotation with the said actuating shaft and having a plurality of parallel threaded holes symmetrically positioned about the axis of the said actuating shaft adjacent the outer periphery of the said head member, a flat ring-shaped member secured to the said member for rotation therewith and having a plurality of parallel smooth bore holes respectively in alignment with the threaded holes of the said head member, a plurality of threaded rod-shaped members each having an enlarged central portion and each formed with a threaded portion with inclined and flat surfaces at one end and a slotted smooth portion at the opposite end thereof, said threaded portions being of progressively increasing lengths from the shortest to the longest threaded portion and respectively positioned in the said holes so that the said enlarged portions will be positioned in the said progressive relation between the carrier member and the said plate-shaped member, a band-shaped resilient member positioned on the ring-shaped member for individually holding the said screw members against the said ring-shaped member, a roller-shaped member normally positioned between certain of the said teeth of the said head member, an arm-shaped member rotative on said fixed support, resilient means for causing the said arm-shaped member to hold the said roller member against said teeth, said electrical device being mounted on said fixed support so that the said conical surface of the said slidable control shaft will be continuously positioned in the paths of the said inclined surfaces of the said screw members one after the other as the said disc-shaped carrier member is rotated between said actuating shaft, the said slidable control member being located substantially outside the space in which the adjusting screws rotate during the operation of the said revolving head, said sliding control shaft comprising a protrusion which radially extends within this said space and between the flattened extremity of the contacting adjusting screw and the said sliding shaft.

9. Apparatus for selectively adjusting an electrical device provided with a resilient slidable control shaft having an end portion with a conical-shaped surface, which comprises a fixed support member formed with two rigidly spaced apart parallel head plates, bearing members mounted on said plates, an actuating shaft member mounted for rotation on the said bearing members, a disc-shaped toothed revolving head member mounted between the said plates for rotation with the said actuating shaft and having a plurality of parallel threaded holes symmetrically positioned about the axis of the said actuating shaft and adjacent the outer periphery of the said revolving head member, a flat ring-shaped member secured to the said head member for rotation therewith and having a plurality of parallel smooth bore holes respectively in alignment with the threaded holes of the said head member, a plurality of threaded rod-shaped members each having an enlarged central portion and each formed with a threaded portion with inclined and flat surfaces at one end and a slotted smooth portion at the opposite end thereof, said threaded portions being provided with various lengths and respectively positioned in said holes so that the said enlarged portions will be positioned between the said revolving head member and the said plate-shaped member, a band-shaped resilient member mounted on said plate-shaped member for individually holding the said screw members in their adjusted positions, a roller-shaped member normally positioned between certain of the said teeth of the said head member, an arm-shaped member rotatably mounted on the said fixed support, further resilient means for causing the said arm-shaped member to resiliently hold the said roller member against said teeth, said electrical device being mounted on said fixed member so that the said conical surface of the said slidable control shaft will be located substantially outside the space in which the adjusting screws rotate in the operation of the said revolving head, said enlarged portions of the said rod-shaped members limiting the relative displacement of the said rod-shaped members and therethrough the control shaft actuation of the inclined surfaces thereof, the contacting action of the conical-shaped surface of the slidable control shaft and the inclined surfaces of the said rod-shaped members being continuous and interrupted thereby to cause a continuous uninterrupted slidable movement of the said control shaft as a function of the rotary movement of the said actuating shaft.

ALEXANDRE HOROWITZ.

REFERENCES CITED

The following references are of record in the file of this patent:

UNITED STATES PATENTS

| Number | Name | Date |
|---|---|---|
| 1,684,519 | Scheerbarth | Sept. 18, 1928 |
| 2,310,720 | Wandrey | Feb. 9, 1943 |
| 2,342,691 | Plensler | Feb. 29, 1944 |
| 2,399,704 | White | May 7, 1946 |